United States Patent [19]
Murakami et al.

[11] Patent Number: 5,681,900
[45] Date of Patent: Oct. 28, 1997

[54] HYDROGENATED NORBORNENE RING-OPENING POLYMERIZATION PRODUCT, A PROCESS FOR PRODUCTION THEREOF AND USES THEREOF

[75] Inventors: Toshihide Murakami, Tokyo; Teiji Kohara, Kawasaki; Tadao Natsuume, Yokosuka, all of Japan

[73] Assignee: Nippon Zeon Co., Ltd., Tokyo, Japan

[21] Appl. No.: 537,866

[22] PCT Filed: Jul. 28, 1994

[86] PCT No.: PCT/JP94/01244
  § 371 Date: Jan. 22, 1996
  § 102(e) Date: Jan. 22, 1996

[87] PCT Pub. No.: WO95/04096
  PCT Pub. Date: Feb. 9, 1995

[30] Foreign Application Priority Data

Jul. 30, 1993 [JP] Japan .................... 5-208508

[51] Int. Cl.⁶ .................... C08G 61/08; C08G 61/06; C08F 32/08
[52] U.S. Cl. .................... 525/339; 525/338; 525/332.1; 526/281; 526/308; 526/309
[58] Field of Search .................... 525/338, 339, 525/332.1; 526/281, 308, 309

[56] References Cited

FOREIGN PATENT DOCUMENTS

| | | |
|---|---|---|
| 0 405 843 A2 | 1/1991 | European Pat. Off. |
| 0 410 605 A2 | 1/1991 | European Pat. Off. |
| 0 436 372 A2 | 7/1991 | European Pat. Off. |
| 4353518 | 8/1992 | Japan . |
| 4-353518 | 12/1992 | Japan . |

*Primary Examiner*—Fred Zitomer
*Attorney, Agent, or Firm*—Armstrong, Westerman, Hattori, McLeland & Naughton

[57] ABSTRACT

A resin obtained by subjecting a norbornene type monomer having an aromatic ring structure (e.g. 5-phenyl-2-norbornene) to ring-opening polymerization and hydrogenating 95% or more of the unsaturated bonds in the backbone structure of the resulting polymer by the use of a catalyst composed of a combination of a transition metal compound and an alkyl metal compound, while leaving 80% or more of the aromatic ring structures, which resin has not only a high refractive index but also characteristics of a hydrogenated norbornene ring-opening polymerization product, i.e., excellent heat resistance, transparency, low birefringent properties, weather resistance, light resistance, low water absorption properties, moisture resistance, small dielectric constant, small dielectric loss, chemical resistance, etc., said resin being usable in optical materials, medical tools and materials, tools and materials for treating electronic parts, etc.

22 Claims, No Drawings

HYDROGENATED NORBORNENE RING-OPENING POLYMERIZATION PRODUCT, A PROCESS FOR PRODUCTION THEREOF AND USES THEREOF

TECHNICAL FIELD

The present invention relates to a thermoplastic hydrogenated norbornene ring-opening polymerization product which is excellent in heat resistance, transparency, low birefringent properties, weather resistance, light resistance, low water absorption properties, moisture resistance, small dielectric constant, small dielectric loss, chemical resistance, etc. and has a high refractive index; and an optical material, a medical tool or material, an electrical insulating material and a tool or material for treating an electronic part, which are made of said hydrogenated polymerization product.

BACKGROUND ART

It is known that thermoplastic norbornene polymers which are macromolecular materials possessing improved low birefringent properties, moisture resistance and heat resistance, for example, hydrogenated ring-opening polymerization products of a norbornene type monomer, addition copolymers of a norbornene type monomer and ethylene, etc. have excellent characteristics as optical materials such as optical lenses and optical disc base plate (Japanese Patent Unexamined Publication Nos. 60-26024, 64-24826, 60-168708, 61-115912 and 61-120816, etc.).

Thermoplastic norbornene resins begin to be used also in lenses for glasses, etc. as resins having various desirable performance characteristics, and are expected as materials for high-performance lenses and the like. Conventional hydrogenated norbornene ring-opening polymerization products, however, have a refractive index of about 1.53 at most. For satisfying the demand for a further advanced technical knowledge, an optical material having a high refractive index is desired, but no process for producing a thermoplastic norbornene resin having a high refractive index has been known.

It is known that resins used as optical materials, such as poly(methyl methacrylate)s and polycarbonates are given a high refractive index by incorporation of aromatic ring structures or halogen atoms (Japanese Patent Unexamined Publication Nos. 61-42602 and 60-166307, etc.). As to addition polymers among thermoplastic norbornene resins, a resin obtained from a norbornene type monomer having an aromatic ring structure has been known (Japanese Patent Unexamined Publication No. 2-289637), but the refractive index and the like of this resin have not been known in the concrete.

For using a ring-opening polymerization product of a norbornene type monomer as an optical material, it has been usually modified into a resin containing substantially no unsaturated bond in the backbone structure by hydrogenation before use. However, when a norbornene ring-opening polymerization product having aromatic ring structures is hydrogenated under usual conditions by the use of a catalyst such as a supported hydrogenation catalyst, not only the unsaturated bonds in the backbone structure but also the aromatic ring structures in the resin structure are hydrogenated to be saturated. Therefore, the aromatic ring structures are lost, so that no hydrogenated norbornene ring-opening polymerization product having aromatic ring structures can be obtained.

For example, Japanese Patent Unexamined Publication No. 3-273043 discloses hydrogenation of a norbornene ring-opening polymerization product containing a ring-opening polymerization product of a norbornene type monomer having an aromatic ring structure. However, no hydrogenated norbornene ring-opening polymerization product having aromatic ring structures has been disclosed in the concrete. There have not been disclosed or suggested the idea of leaving aromatic ring structures by choosing a hydrogenation catalyst and hydrogenation reaction conditions and a hydrogenated norbornene ring-opening polymerization product retaining aromatic ring structures.

DISCLOSURE OF THE INVENTION

The present inventors earnestly investigated in order to develop a novel resin usable in optical materials, medical tools and materials, electrical insulating materials, etc., and consequently found that a resin obtained by hydrogenating the unsaturated bonds in the backbone structure of a norbornene ring-opening polymerization product with aromatic ring structures while leaving the aromatic ring structures is excellent in heat resistance, transparency, low birefringent properties, weather resistance, light resistance, low water absorption properties, moisture resistance, small dielectric constant, small dielectric loss, chemical resistance, etc. and has a high refractive index, whereby the present invention has been accomplished.

BEST MODE FOR CARRYING OUT THE INVENTION

Thus, according to the present invention, there are provided a hydrogenated norbornene ring-opening polymerization product characterized in that it is a hydrogenated product of a norbornene ring-opening polymerization product having aromatic ring structures, 95% or more of the unsaturated bonds in the polymer backbone structure are hydrogenated, and 80% or more of the aromatic ring structures are retained; and an optical material, a medical tool or material, an electrical insulating material and a tool or material for treating an electronic part, which are made of said hydrogenated polymerization product.

Norbornene Ring-opening Polymerization Product

The norbornene ring-opening polymerization product used in the present invention has aromatic ring structures and is a Methatesis polymer of a norbornene type monomer having the aromatic ring structure or a Methatesis copolymer of said monomer and a comonomer. Although the comonomer is not particularly limited so long as it is Methatesis polymerizable, it is preferably a norbornene type monomer other than norbornene type monomers having an aromatic ring structure in order that the copolymer or a hydrogenated product thereof may have desirable characteristics as an optical material, such as low birefringent properties.

The amount of repeating structural units formed by ring opening of the norbornene type monomer having an aromatic ring structure is usually 30% by weight or more, preferably 50% by weight or more, more preferably 70% by weight or more, based on the total weight of the repeating structural units in the polymer structure. The larger the amount, the higher the refractive index of the resulting hydrogenated product. Therefore, the refractive index of the hydrogenated product can be controlled by varying the amount of the norbornene type monomer having an aromatic ring structure. In particular, for giving a high refractive index to the hydrogenated product, repeating structural units formed by ring opening of the norbornene type monomer having an aromatic ring structure substituted by a halogen substituent are incorporated into the hydrogenated polymer in an amount of preferably 30% by weight or more, more preferably 50% by weight or more, particularly preferably 70% by weight or more. For giving a low birefringence to the hydrogenated product, the amount of repeating structural units formed by ring opening of the norbornene type monomer(s) is preferably large among all the repeating structural units in the polymer structure. It is sufficient that the amount of repeating structural units formed by ring opening of the norbornene type monomer(s) is 50% by weight or more, preferably 70% by weight or more, more preferably 90% by weight or more, based on the total weight of the repeating structural units, irrespective of the presence of an aromatic ring in the norbornene type monomer(s).

The norbornene type monomer having an aromatic ring structure used in the present invention is a monomer having an aromatic ring structure among norbornene type monomers. As the norbornene type monomer having an aromatic ring structure, there are exemplified norbornene type monomers having an aromatic substituent and norbornene type monomers having in its polycyclic structure a norbornene ring structure and an aromatic ring structure. The norbornene type monomer having an aromatic ring structure includes, for example, norbornene type monomers having an aromatic substituent, such as norbornene derivatives having an aromatic substituent [e.g. 5-phenyl-2-norbornene, 5-(4-methylphenyl)-2-norbornene, 5-(1-naphthyl)-2-norbornene and 9-(2-norbornen-5-yl)-carbazole]; and norbornene type monomers having in its polycyclic structure a norbornene ring structure and an aromatic ring structure, such as 1,4-methano-1,4,4a,9a-tetrahydrofluorene and derivatives thereof [e.g. 1,4-methano-1,4,4a,9a-tetrahydrofluorene, 1,4-methano-8-methyl-1,4,4a,9a-tetrahydrofluorene, 1,4-methano-8-chloro-1,4,4a,9a-tetrahydrofluorene and 1,4-methano-8-bromo-1,4,4a,9a-tetrahydrofluorene], 1,4-methano-1,4,4a,9a-tetrahydrodibenzofuran and derivatives thereof, 1,4-methano-1,4,4a,9a-tetrahydrocarbazole and derivatives thereof [e.g. 1,4-methano-1,4,4a,9a-tetrahydrocarbazole and 1,4-methano-9-phenyl-1,4,4a,9a-tetrahydrocarbazole], 1,4-methano-1,4,4a,9,9a,10-hexahydroanthracene and derivatives thereof [e.g. 1,4-methano-1,4,4a,9,9a,10-hexahydroanthracene, 1,4-methano-9,10[1',2']-benzeno-1,4,4a,9,9a,10-hexahydroanthracene and 1,4-methano-1,4,4a,9,10,10a-hexahydrophenanthrene], and 7,10-methano-6b,7,10,10a-tetrahydrofluoracene and derivatives thereof. There may also be used alkyl-, alkylidene- or alkenyl-substituted derivatives of these compounds, and substituted derivatives of the above substituted or unsubstituted olefins which have as the substituent a polar group such as a halogen, hydroxyl group, ester group, alkoxy group, cyano group, amide group, imide group or silyl group.

The norbornene type monomer having an aromatic ring structure substituted by a halogen substituent which is preferably used for obtaining a resin having a higher refractive index is one which is obtained by substituting a part of the aromatic ring structure of a norbornene type monomer having the aromatic ring structure by the halogen substituent such as chlorine or bromine. Said norbornene type monomer includes, for example, 1,4-methano-8-bromo-1,4,4a,9a-tetrahydrofluorene, 1,4-methano-6-bromo-1,4,4a,9a-tetrahydrofluorene and 1,4-methano-6,8-dibromo-1,4,4a,9a-tetrahydrofluorene.

The norbornene type monomer used as a comonomer if necessary is a norbornene type monomer other than norbornene type monomers having an aromatic ring structure, as described above, and is well known in Japanese Patent Unexamined Publication Nos. 2-227424, 2-276842, 4-14882, 3-122137 and 4-63807, etc. Said norbornene type monomer includes, for example, norbornene, alkyl-, alkylidene- or alkenyl-substituted norbornene derivatives thereof, and substituted derivatives of the these substituted or unsubstituted olefins which have as the substituent a polar group such as a halogen, hydroxyl group, ester group, alkoxy group, cyano group, amide group, imide group or silyl group. Specific examples of said norbornene type monomer are 2-norbornene, 5-methyl-2-norbornene, 5,5-dimethyl-2-norbornene, 5-ethyl-2-norbornene, 5-butylnorbornene, 5-ethylidene-2-norbornene, 5-isopropenyl-2-norbornene, 5-methoxycarbonyl-2-norbornene, 5-cyano-2-norbornene, 5-methyl-5-methoxycarbonyl-2-norbornene, etc.; and cyclopentadiene oligomers, and the same derivatives and substituted products as above of the oligomers, specific examples of which are dicyclopentadiene, 2,3-dihydrodicyclopentadiene, 1,4:5,8-dimethano-1,2,3,4,4a,5,8,8a-2,3-cyclopentadienonaphthalene, 1,4:5,8-dimethano-1,4,4a,5,6,7,8,8a-octahydronaphthalene, 6-ethyl-1,4:5,8-dimethano-1,4,4a,5,6,7,8,8a-octahydronaphthalene and 1,4:5,10:6,9-trimethano-1,2,3,4,4a,5,5a,6,9,9a,10,10a-dodecahydro-2,3-cyclopentadienoanthracene.

The norbornene type monomer(s) may be polymerized by a conventional method. In copolymerization of the norbornene type monomers, the proportions of the monomers polymerized are usually substantially the same as those of the repeating structural units derived from the respective monomers in the polymer structure. However, for example, when a Methatesis polymerizable monomer other than norbornene type monomers is used as a comonomer, the proportions of the monomers polymerized are, in some cases, utterly different from those of the repeating structural units derived from the respective monomers in the polymer structure, owing to the difference in reactivity between the monomers in Methatesis polymerization reaction. In such a case, it is sufficient that the proportions of the monomers to be polymerized are controlled depending on the reactivity of the comonomer and the like so that the proportions of the repeating structural units may be in the above range.

In addition, the ring-opening polymerization product may be modified with an α,β-unsaturated carboxylic acid and/or a derivative thereof, a styrene type hydrocarbon, an organosilicon compound having an olefinic unsaturated bond and a hydrolyzable group, or an unsaturated epoxy monomer by the method well known in Japanese Patent Unexamined Publication No. 3-95235 and the like so long as the object of the present invention is not defeated. For obtaining a product excellent in moisture resistance and chemical resistance, a ring-opening polymerization product containing no polar group is preferable.

The ring-opening polymerization (copolymerization) product used in the present invention has an intrinsic viscosity [η] of 0.1 to 20 dl/g, preferably 0.2 to 10 dl/g, more preferably 0.3 to 5 dl/g, as measured at 25° C. in toluene. When the intrinsic viscosity is too low, the mechanical strength of the hydrogenated product of the present invention is decreased. When the molecular weight is too high, the melt viscosity becomes too high, so that the hydrogenated product becomes difficult to mold.

Hydrogenation Catalyst

A hydrogenation catalyst used for hydrogenating the norbornene ring-opening polymerization product in the present invention is a catalyst composed of a combination of a transition metal compound and an alkyl metal compound. There are exemplified combinations such as cobalt acetate/triethylaluminum, nickel acetylacetonate/triisobutylaluminum, titanocene dichloride/n-butyllithium, zirconocene dichloride/sec-butyllithium, tetrabutoxytitanate/dimethylmagnesium, etc. By controlling the hydrogenation reaction conditions strictly by the use of such a hydrogenation catalyst, the unsaturated bonds in the backbone structure can be selectively hydrogenated while leaving the unsaturated bonds in the aromatic ring structures. The aromatic ring structures are highly stable to oxidation and are not substantially deteriorated by heat, light, chemicals, etc. even when their unsaturated bonds are maintained.

In the present invention, the hydrogenation reaction of the norbornene ring-opening polymerization product is usually carried out in an inert organic solvent. As the organic solvent, hydrocarbon solvents are preferable because the resulting hydrogenated product is highly soluble in them. Cyclic hydrocarbon solvents are more preferable. Such hydrocarbon solvents include, for example, aromatic hydrocarbons such as benzene, toluene, etc.; aliphatic hydrocarbons such as n-pentane, hexane, etc.; alicyclic hydrocarbons such as cyclohexane, decalin, etc.; and ethers such as tetrahydrofuran, ethylene glycol dimethyl ether, etc. These may be used singly or as a mixture of two or more thereof. When the solvent is used, the concentration is preferably adjusted so that the amount of the solvent used may be 0.8 to 20 parts by weight, in particular, 1 to 10 parts by weight, per part by weight of the norbornene ring-opening polymerization product. Usually, the solvent may be the same as a solvent for polymerization reaction. It is sufficient that the hydrogenation catalyst is added to a polymerization reaction solution as it is, to carry out the reaction.

Hydrogenation Reaction

In the present invention, a catalyst composed of a combination of a transition metal compound and an alkyl metal compound is used as the hydrogenation catalyst. The hydrogenation rate should be controlled by controlling the temperature and hydrogen pressure at the hydrogenation reaction of the norbornene polymer and the reaction time, depending on the kind(s) of the monomer(s) used for the ring-opening polymerization, the kind of the hydrogenation catalyst, the kind of the solvent. To hydrogenate the unsaturated bonds of the main chain selectively without hydrogenating the aromatic rings, it is sufficient that the hydrogenation reaction is carried out at a temperature of −10° C. to 120° C., preferably 0°–100° C., more preferably 20°–80° C. and a hydrogen pressure of 0.1–50 kgf/cm$^2$, preferably 0.5–30 kgf/cm$^2$, more preferably 1–20 kgf/cm$^2$. When the temperature or the hydrogen pressure is too high, the control of the reaction is difficult, and the aromatic rings are also easily hydrogenated even in a short reaction time, so that it is difficult to control the hydrogenation rate of the aromatic rings with high reproduction. Therefore, it is difficult to control the refractive index of the resulting hydrogenated product. When the temperature or the hydrogen pressure is too low, the hydrogenation reaction of the backbone structure does not proceed easily.

The removal of the catalyst after completion of the hydrogenation reaction may be carried out by a conventional method such as centrifugation or filtration. If necessary, it is also possible to utilize a catalyst-inactivating agent such as water or an alcohol or add an adsorbent such as activated clay or alumina. A method for the centrifugation or the filtration is not particularly limited so long as there are employed conditions under which the catalyst used can be removed. The removal by filtration is preferable because it is easy and efficient. The filtration may be either pressure filtration or suction filtration. From the viewpoint of efficiency, it is preferable to use a filter aid such as diatomaceous earth or pearlite.

Hydrogenated Product

The hydrogenated norbornene ring-opening polymerization product having aromatic ring structures of the present invention is preferably excellent in resistance to light deterioration and resistance to weather deterioration. For this purpose, preferably 95% or more, more preferably 98% or more, particularly preferably 99% or more, of the unsaturated bonds in the backbone structure are saturated. The unsaturated bonds in the backbone structure can be distinguished from the unsaturated bonds in the aromatic ring structures by analysis by $^1$H-NMR. In the present invention, the larger the amount of remaining aromatic ring structures, the higher the refractive index of the resulting resin. In the hydrogenated product of the present invention, 80% or more, preferably 85% or more, more preferably 90% or more, of the aromatic ring structures of the polymer before the hydrogenation are retained. Not only the hydrogenation rate but also the remaining rate of the aromatic rings vary depending on the kind of the hydrogenation catalyst, the reaction temperature, etc. When the above-exemplified hydrogenation catalyst is used, controls such as reduction of the reaction temperature, the hydrogen pressure and/or the reaction time should be carried out depending on the kind(s) of the monomer(s) used, the kind of the hydrogenation catalyst, the kind of the solvent, etc. in order to leave the unsaturated bonds of the aromatic rings in an amount larger than a certain amount.

The hydrogenated norbornene ring-opening polymerization product having aromatic ring structures of the present invention may be modified with an α,β-unsaturated carboxylic acid and/or a derivative thereof, a styrene type hydrocarbon, an organosilicon compound having an olefinic unsaturated bond and a hydrolyzable group, or an unsaturated epoxy monomer by the method well known in Japanese Patent Unexamined Publication No. 3-95235, etc.

The hydrogenated product of the present invention has substantially the same molecular size as that of the ring-opening polymerization product before the hydrogenation reaction, and has an intrinsic viscosity [η] of 0.1 to 20 dl/g, preferably 0.2 to 10 dl/g, more preferably 0.3 to 5 dl/g, as measured at 25° C. in toluene. When the intrinsic viscosity is too low, the mechanical strength of the hydrogenated product of the present invention is decreased. When the molecular weight is too high, the melt viscosity becomes too high, so that the hydrogenated product becomes difficult to mold.

The hydrogenated norbornene ring-opening polymerization product having aromatic ring structures of the present invention is noncrystalline and transparent and is excellent in low birefringent properties, heat resistance and low hygroscopicity. Its grass transition temperature (hereinafter referred to as Tg), an indication of the heat resistance is usually 70° C. or higher, preferably 90° C. or higher. When a plate of 1.2 mm thickness is molded out of said hydrogenated product, it can be obtained as a plate having a transmittance for light with a wavelength of 400 to 830 nm of 70% or more, preferably 80% or more. Depending on a molding method, when a plate of 1.2 mm thickness is molded, it can be obtained also as a plate having a retardation value of 100 nm or less, preferably 50 nm or less, as measured by a double pass method at a wavelength of 830 nm.

Furthermore, the hydrogenated norbornene ring-opening polymerization product of the present invention has a high refractive index and can be obtained as one which has a refractive index [$nD_{25}$] at 25° C. and a wavelength of 589 nm of 1.560 or more.

Resin Composition

For obtaining a hydrogenated product having a proper refractive index, there may be employed a method of adjusting the amount of the monomer with an aromatic ring structure used, as described above, or a resin composition may be prepared by mixing hydrogenated products having different refractive indexes. Hydrogenated norbornene ring-opening polymerization products can be mixed with each other relatively easily, and therefore when a hydrogenated product having a high refractive index and a hydrogenated product having a low refractive index are mixed, a resin composition having a refractive index intermediate between the high and low refractive indexes can be obtained. A resin composition having a desired refractive index can be obtained by varying the mixing proportions of the two hydrogenated products.

A method for the mixing is not particularly limited. For making the composition homogeneous, a method of mixing and stirring solutions of the two hydrogenated products, respectively, and removing the solvents is preferable. To simplify the procedure, kneading of the two hydrogenated products is sufficient.

For improving the homogeneity and compatibility of the resin composition, it is preferable to use the hydrogenated product of the present invention and a hydrogenated product obtained by hydrogenating the ring-opening polymerization product used for obtaining the hydrogenated product of the present invention, by the use of a hydrogenation catalyst capable of hydrogenating also the unsaturated bonds of the aromatic rings, such as nickel-alumina supported catalyst to adjust the hydrogenation rate of unsaturated bond portions of the aromatic ring structures to 95% or more, preferably 98% or more, more preferably 98% or more, of the unsaturated bonds of the aromatic ring structures before the hydrogenation.

The following is also possible: the hydrogenated product of the present invention is hydrogenated using a hydrogenation catalyst capable of hydrogenating also the unsaturated bonds of the aromatic rings, and the remaining rate of the aromatic ring structures is varied by controlling the reaction temperature and the reaction time, whereby the refractive index is controlled.

Molding or Forming

The hydrogenated norbornene ring-opening polymerization product or the resin composition of the present invention can be molded or formed by a conventional method such as injection molding, blow molding, injection blow molding, rotational molding (or rotoforming), vacuum forming, extrusion molding, calendering, or solvent casting.

Additives

If desired, various additived may be added to the hydrogenated norbornene ring-opening polymerization product or the resin composition of the present invention (they are hereinafter referred to as "the hydrogenated product of the present invention or the like" in some cases). The additives used include, for example, phenolic or phosphorus-containing antioxidants, antistatic agents, ultraviolet absorbers, rubber-like polymers and petroleum resins. For adjusting the refractive index and mechanical characteristics, there may be incorporated, for example, different thermoplastic resins such as polycarbonates, polystyrenes, polyphenylene sulfides, polyether imides, polyesters, polyamides, polyacrylates, polysulfones, polyether sulfones, etc. For improving the moldability, physical properties and the like, there may be added, for example, fibrous fillers such as glass fiber, carbon fiber, etc.; spherical or non-spherical particulate fillers of silica, alumina, talc, aluminum hydroxide, calcium carbonate, etc.; light stabilizers; lubricants; flame retardants; pigments; dyes; and anti-blocking agents. In general, for avoiding the dissolution and release from the resin of these additives, the additives preferably have as high a molecular weight as possible, and the amount of the additives added is preferably as small as possible.

When a sheet is formed by a solvent casting method, a leveling agent may be added for reducing the surface roughness. As the leveling agent, there can be used leveling agents for coating materials, such as fluorine-containing nonionic surface active agents, speciality acrylic resin-based leveling agents and silicone-based leveling agents. Of these, agents having a good compatibility with the solvent are preferable.

When the additives are added to the hydrogenated norbornene ring-opening polymerization product or the resin composition of the present invention, they are added within a range suitable for a purpose. For example, the addition of the additives usually deteriorates the transparency of the hydrogenated product or the like. But, for example, when the hydrogenated product or the like is molded into a drug container, the container requires such a transparency that the amount and condition of the contents can be confirmed. The light transmittance of the hydrogenated product or the like which is necessary for this purpose is usually 40% or more, preferably 50% or more, more preferably 60% or more, as measured in a wavelength range of 400 to 700 nm by the use of a molded plate of 2 mm thickness obtained by molding the hydrogenated product or the like. In addition, the additives affect also the electrical characteristics of the hydrogenated product or the like. When used as an electrical insulating material, the hydrogenated product or the resin composition of the present invention should have a volume resistivity of $10^{16}$ Ωcm or more, preferably $5 \times 10^{16}$ Ωcm or more; a dielectric constant of 3 or less, preferably 2.5 or less, at any of wavelengths $10^2$ Hz, $10^6$ Hz and $10^9$ Hz; a dielectric loss tangent of $10^{-3}$ or less, preferably $7 \times 10^{-4}$ or less, at any of wavelengths $10^2$ Hz, $10^6$ Hz and $10^9$ Hz.

Uses

The hydrogenated norbornene ring-opening polymerization product or the resin composition of the present invention is useful in various fields, for producing various molded articles such as optical materials. The hydrogenated product or the composition can be utilized for various purposes, for example, the hydrogenated product or the composition can be used in optical materials; medical tools and materials; electrical insulating materials; tools and materials for treating electronic parts; electronic parts such as a window for light-receiving element, etc.; construction materials and building materials, such as windows, parts for machinery and tools, housings, etc.; tools and materials for automobile, such as bumpers, room mirror, head lamp covers, tail lamp covers, instrument panel, etc.; tools and materials for electric appliances, such as speaker cone materials, vibrating elements for speaker, vessels for electronic oven, etc.; films; sheets; and helmets.

Optical Materials

As described above, the hydrogenated norbornene ring-opening polymerization product or the resin composition of the present invention is excellent in transparency and low birefringent properties and hence can be used as an optical material. Particularly when the hydrogenated product or the like is used in a lens, a prism or the like, in which light refraction is utilized, the lens, prism or the like can be provided as a product having a refractive index of 1.560 or more, preferably 1.570, particularly preferably 1.580. A prism having a high spectral ability or a lens having a short focal length in spite of its small surface curvature can be obtained by using the hydrogenated product or the like of the present invention. Furthermore, since the hydrogenated product or the like of the present invention is excellent in heat resistance, low hygroscopicity and resistance to water absorption properties and has mechanical toughness, the hydrogenated product or the like is useful as an optical material for, for example, an optical disc, optical fiber, optical mirror, liquid crystal display device substrate, light-guiding plate, light-diffusing plate, polarizing film and phase-contrast film.

Medical Tools and Materials

The hydrogenated norbornene ring-opening polymerization product or the resin composition of the present invention hardly adsorves chemicals, in particular, chemicals having a polar group, such as alcohols, amines, esters, amides, ethers, carboxylic acids and amino acids. In addition, organic substances and the like, which are contained as impurities in the hydrogenated product or the resin composition are hardly leached. Therefore, even if the hydrogenated product or the like comes into contact with a chemical, the hydrogenated product or the like does not change the quality of the chemical. Moreover, the impurities are hardly dissolved in a chemical contacting with the hydrogenated product or the like. Accordingly, the hydrogenated product or the like of the present invention can be used in medical tools and materials.

As the medical tool or material of the present invention, there are exemplified containers for liquid, powdered or solid drugs, such as liquid-drug containers for injections, ampuls, prefilled syringes, bags for transfusion, solid-drug containers, ophthalmic-solution containers, etc.; sample containers such as sampling test tubes for blood examination, blood-colecting tubes, specimen containers, etc.; medical tools such as injectors, etc.; sterilizing vessels for medical tools such as surgical knives, forceps, gauze, contact lenses, etc.; experimental or analytical instruments such as beakers, Petri dishes, flasks, test tubes, centrifuge tubes, etc.; medical optical parts such as plastic lenses for medical examination, etc.; piping materials such as medical transfusing tubes, piping, joints, valves, etc.; and artificial organs and parts therefor, such as denture base, artificial heart, artificial dental root, etc. A phial for storing a drug, in particular, a liquid drug, a prefilled syringe, a sealed medicine bag, a container for instillation, etc., which are made of the hydrogenated product or the resin composition of the present invention have the following desirable properties as compared with conventional resin-made ones: in addition to their transparency, physical properties, etc., they have excellent chemical resistance because they contain no impurities and the like, which are releasable from the resin by dissolution, and they hardly change the quality of chemicals because they do not adsorb the chemicals.

Electrical Insulating Materials

The hydrogenated norbornene ring-opening polymerization product or the resin composition of the present invention is useful as an electrical insulating material in various fields. The hydrogenated product or the resin composition can be suitably used in, for example, general insulating materials such as covering materials for electric wire and cable, and insulating materials for office automation appliances (e.g. electronic machines for livelihood or industry, duplicators, computers and printers) and meters; circuit boards (e.g. rigid printed boards, flexible printed boards and multilayer printed wiring boards) and high-frequency circuit boards for satellite communication equipments and the like which particularly require high-frequency characteristics; base materials for transparent and electrically conductive films for, for example, surface heating elements of liquid crystal substrates, optical memories, defrosters of automobiles or airplanes, etc.; semiconductor sealing materials and parts for transistors, IC, LSI, LED, etc.; sealing materials for electric or electronic parts such as motors, connectors, switches, sensors, etc.; materials for bodies of a television, video movie camera, etc.; and structural members for parabolic antennas, flat antennas, and rader domes.

Tools and Materials for Treating Electronic Parts

The hydrogenated norbornene ring-opening polymerization product or the resin composition of the present invention has desirable properties as a tool or material for treating an electronic part, in addition to their physical properties and the like because the hydrogenated product or the resin composition contains substantially no impurities and the like, which are releasable from the resin by dissolution, and the hydrogenated product or the resin composition is resistant to many of chemicals used for treating electronic parts, in particular, almost all strong acids except sulfuric acid.

The tools and materials for treating electronic parts refer to (A) tools and materials, which come into contact with electronic parts such as semiconductors and hybrid IC (e.g. IC and LSI), liquid crystal display devices, light emitting diodes, etc., (B) tools and materials, which come into contact with intermediates for production of electronic parts, such as wafers, liquid crystal substrates, and laminates obtained by laminating a transparent electrode layer, a protective film, etc. on the wafer or the liquid crystal substrate, and (C) tools and materials, which come into contact with treating fluids such as liquid chemicals, ultrapure water, etc., which are used for treating intermediates for production in production processes of electronic parts. As (A) the tools and materials, which come into contact with electronic parts, and (B) the tools and materials, which come into contact with intermediates for production of electronic parts, there are exemplified containers for treatment and transportation, such as tanks, trays, carriers, cases, etc.; and protective materials such as carrier tapes, separation films, etc. As (C) the tools and materials, which come into contact with treating fluids, there are exemplified piping such as pipes, tubes, valves, sippers, flowmeter, filters, pumps, etc.; and containers for liquids, such as sampling containers, bottles, ampules, bags, etc.

EXAMPLES

The present invention is more concretely explained below with reference to referential examples, examples and comparative examples. Refractive index [nD$_{25}$] was measured by means of an Abbe's refractometer, hydrogenation rate by $^1$H-NMR, intrinsic viscosity [η] in toluene at 25° C., Tg by a DSC method, and retardation value by a double pass method at a wavelength of 830 nm.

Referential Example 1

60 Parts by weight of 1,4-methano-1,4,4a,9a-tetrahydrofluorene and 200 parts by weight of toluene were charged into a glass reactor whose inner atmosphere had been replaced with nitrogen, and 1 part by weight of hexene-1 was added as a molecular weight modifier. The resulting solution was heated to 40° C., after which 10 parts by weight of a 15% solution of triethylaluminum as polymerization catalyst in toluene, 5 parts by weight of triethylamine and 10 parts by weight of a 20% solution of titanium tetrachloride in toluene were added to initiate ring-opening polymerization. This reaction was continued for 1 hour while maintaining the temperature of the solution at 40° C., and then terminated by adding 5 parts by weight of methanol. The reaction solution was poured into 1,000 parts by weight of a mixed solution of 500 parts by weight of acetone and 500 parts by weight of isopropanol while stirring the mixture vigorously, to precipitate a polymer, and the precipitated polymer was recovered by filtration. The polymer thus obtained was washed with 200 parts by weight of acetone and then dried at 100° C. for 24 hours in a vacuum dryer evacuated to a reduced pressure of 1 mmHg or less, to obtain 52 parts by weight of the polymer.

The intrinsic viscosity of the polymer was 0.42 dl/g as measured at 25° C. in toluene. In $^1$H-NMR spectrum (at 30° C. in chloroform-d$_1$) of the polymer, there were observed an absorption due to a proton bonded to a benzene ring at 7.4–6.8 ppm, an absorption due to a proton bonded to the unsaturated carbon of a —C=CH— group at 5.9–4.6 ppm and an absorption due to a proton bonded to saturated carbon at 4.0–0.8 ppm, in the intensity ratio of 4:2:8. Thus, the polymer obtained was identified as a ring-opening polymerization product of 1,4-methano-1,4,4a,9a-tetrahydrofluorene.

Referential Example 2

54 Parts by weight of a polymer was obtained in the same manner as in Referential Example 1 except for using 24 parts by weight of a mixture of 36 parts by weight of 1,4-methano-1,4,4a,9a-tetrahydrofluorene and 24 parts by weight of 4,7-methano-3a,4,7,7a-tetrahydroindene in place of 60 parts by weight of 1,4-methano-1,4,4a,9a-tetrahydrofluorene.

The intrinsic viscosity of the polymer was 0.40 dl/g as measured at 25° C. in toluene. In $^1$H-NMR spectrum (at 30° C. in chloroform-d$_1$) of the polymer, there were observed an absorption due to a proton bonded to a benzene ring at 7.4–6.8 ppm, an absorption due to a proton bonded to the unsaturated carbon of a —HC=CH— group at 5.9–4.4 ppm and an absorption due to a proton bonded to saturated carbon at 4.0–0.8 ppm, in the intensity ratio of 17:22:61. Thus, the polymer obtained was identified as a ring-opening copolymerization product of 1,4-methano-1,4,4a,9a-tetrahydrofluorene and 4,7-methano-3a,4,7,7a-tetrahydroindene in the weight ratio of approximately 37:23.

Referential Example 3

51 Parts by weight of a polymer was obtained in the same manner as in Referential Example 1 except for using 7,10-methano-6b,7,10,10a-tetrahydrofluoranthene in place of 1,4-methano-1,4,4a,9a-tetrahydrofluorene.

The intrinsic viscosity of the polymer was 0.46 dl/g as measured at 25° C. in toluene. In $^1$H-NMR spectrum (at 30° C. in chloroform-d$_1$) of the polymer, there were observed an absorption due to a proton bonded to a naphthalene ring at 7.7–7.3 ppm, an absorption due to a proton bonded to the unsaturated carbon of a —HC=CH— group at 6.2–4.6 ppm and an absorption due to a proton bonded to saturated carbon at 4.2–0.8 ppm, in the intensity ratio of 6:2:6. Thus, the polymer obtained was identified as a ring-opening polymerization product of 7,10-methano-6b,7,10,10a-tetrahydrofluoranthene.

Referential Example 4

47 Parts by weight of a polymer was obtained in the same manner as in Referential Example 1 except for using 1,4-methano-1,4,4a,9a-tetrahydrodibenzofuran in place of 1,4-methano-1,4,4a,9a-tetrahydrofluorene.

The intrinsic viscosity of the polymer was 0.41 dl/g as measured at 25° C. in toluene. In $^1$H-NMR spectrum (at 30° C. in chloroform-d$_1$) of the polymer, there were observed an absorption due to a proton bonded to a benzene ring at 7.2–6.9 ppm, an absorption due to a proton bonded to the unsaturated carbon of a —HC=CH— group at 6.4–4.6 ppm and an absorption due to a proton bonded to saturated carbon at 4.1–0.6 ppm, in the intensity ratio of 4:2:6. Thus, the polymer obtained was identified as a ring-opening polymerization product of 1,4-methano-1,4,4a,9a-tetrahydrodibenzofuran.

Referential Example 5

38 Parts by weight of a polymer was obtained in the same manner as in Referential Example 1 except for using 1,4-methano-8-bromo-1,4,4a,9a-tetrahydrofluorene in place of 1,4-methano-1,4,4a,9a-tetrahydrofluorene.

The intrinsic viscosity of the polymer was 0.37 dl/g as measured at 25° C. in toluene. In $^1$H-NMR spectrum (at 30° C. in chloroform-d1) of the polymer, there were observed an absorption due to a proton bonded to a benzene ring at 7.3–7.1 ppm, an absorption due to a proton bonded to the unsaturated carbon of a —HC=CH— group at 6.4–4.6 ppm and an absorption due to a proton bonded to saturated carbon at 4.1–0.6 ppm, in the intensity ratio of 3:2:8. Thus, the polymer obtained was identified as a ring-opening polymerization product of 1,4-methano-8-bromo-1,4,4a,9a-tetrahydrofluorene.

Example 1

A solution of 20 parts by weight of the polymer obtained in Referential Example 1 in 80 parts by weight of toluene, and 0.4 part by weight of nickel(II) acetylacetonate were charged into an autoclave equipped with a stirrer. The inner atmosphere of the autoclave was replaced with hydrogen, after which 3 parts by weight of a 15% solution of triisobutylaluminum in toluene was charged into the autoclave and the reaction was carried out for 1 hour at a hydrogen pressure of 10 kgf/cm$^2$ and a temperature of 80° C. After completion of the reaction, 0.5 part by weight of isopropanol and 1 part by weight of activated clay were added to the reaction mixture and stirred at 30° C. for 2 hours. The resulting solution was filtered through a filter paper with a pore size of 1 μm by using diatomaceous earth as a filter aid. The reaction solution thus obtained was poured into 500 parts by weight of a mixed solution of 250 parts by weight of acetone and 250 parts by weight of isopropanol with vigorous stirring to precipitate a polymer, which was recovered by filtration. Thereafter, the polymer was washed with 200 parts by weight of acetone and then dried at 100° C. for 24 hours in a vacuum dryer evacuated to a reduced pressure of 1 mmHg or less, to obtain 18 parts by weight of polymer A.

Polymer A had an intrinsic viscosity of 0.42 dl/g as measured at 25° C. in toluene, and had a Tg of 145° C. In $^1$H-NMR spectrum (at 30° C. in chloroform-$d_1$) of polymer A, there were observed an absorption due to a proton bonded to a benzene ring at 7.4–6.8 ppm, an absorption due to a proton bonded to the unsaturated carbon of a —HC=CH— group at 5.9–4.6 ppm and an absorption due to a proton bonded to saturated carbon at 4.0–0.8 ppm, in the intensity ratio of 24:0:76. Thus, the following were found: the polymer obtained was a hydrogenated product of the ring-opening polymerization product obtained in Referential Example 1, the hydrogenation rate of the benzene rings was about 3%, and the unsaturated bonds in the backbone structure had been completely hydrogenated.

Polymer A was press-molded into a sheet of 0.3 mm thickness at 200° C. The sheet was colorless and transparent and had a refractive index of 1.586.

Separately, polymer A was press-molded into a disc with a thickness of 1.2 mm and a diameter of 12.5 cm at 200° C. The disc had a light transmittance of 92% or more at 400 to 830 nm and a retardation value of 20 nm or less. When measured by the use of the disc, the volume resistivity of the polymer was $5\times10^{16}$ μcm or more and its dielectric constant and dielectric loss tangent were 2.43 and $5\times10^{-4}$, respectively, at any of frequencies $10^2$ Hz, $10^6$ Hz and $10^9$ Hz.

The ring-opening polymerization product of Referential Example 1 was again hydrogenated under the same conditions as above to obtain 19 parts by weight of polymer B. This resin was the same as polymer A except that it had a refractive index of 1.585 and was different in yield from polymer A. Thus, it was found that the hydrogenation reaction can be controlled with high reproduction.

In addition, a 10 wt % solution of this polymer in cyclohexane was analyzed by atomic absorption spectometry to find that the titanium atom content of the resin was 0.01 ppm (detection limit) or less and the nickel atom content 0.01 ppm (detection limit) or less. Further, 100 mg of the polymer was burned in a DOHRMANN combustor, absorbed into 5 ml of pure water and analyzed by ion chromatography to find that the chlorine atom content was 0.02 ppm (detection limit) or less.

To 17 parts by weight of the polymer was added 0.008 part by weight of an antioxidant (Irganox 1010, mfd. by Ciba-Geigy, Ltd.), and the resulting mixture was extruded into pellets with a twin-screw extruder (TEM-35B, mfd. by Toshiba Machine Co., Ltd.; screw diameter 37 mm, L/D=32, screw revolution rate 250 rpm, resin temperature 270° C., feed rate 10 kg/hour).

Using the pellets, a cylindrical, transparent container with a diameter of 200 mm, a height of 130 mm and an average thickness of 3 mm and 100 mm×50 mm×2.0 mm test pieces were produced by injection molding (clamping pressure 350 tons, resin temperature 280° C., mold temperature 70° C.).

The total light transmittance of the test piece was measured and found to be 90.2%, namely, its transparency was good. Its opacity was measured and found to be 0.1%.

To LB medium (prepared by adjusting an aqueous solution containing 1 wt % bactotryptone, 0.5 wt % yeast extract, 1 wt % NaCl and 0.1 wt % glucose to pH 7.5) was added agar in an amount of 2 wt %, and the resulting mixture was subjected to steam sterilization at 121° C. for 30 minutes to be gelatinized. Before solidification, 300 ml of the gelatinized mixture was placed in the molded container and allowed to stand at room temperature for 6 hours, after which the container was capped with aluminum foil, followed by sterilization by γ-ray irradiation at a dose of 25 kGy. After the above treatment, incubation was carried out at 37° C. for 3 days but no bacterial multiplication took place in the mixture. The appearance of the transparent container after the treatment was so good that pacified portions, cracks and deformation were not visually confirmed.

After the test pieces were immersed in an aqueous sodium carbonate solution having a pH of 9, hydrochloric acid having a pH of 4 and ethanol, respectively, for 48 hours, their appearance was observed and found to be unchanged, and their opacity and total light transmittance also remained unchanged.

Each of these test pieces was cut to a width of 10 mm, and 20 g of the resulting piece was subjected to ultrasonic cleaning in distilled water for 20 minutes and then dried at 40° C. for 10 hours. In a hard-glass flask was placed 20 g of this test piece, followed by adding thereto 200 g of distilled water. The flask was covered with a lid made of hard glass, and allowed to stand at 50° C. for 24 hours, after which the distilled water was recovered.

For comparison, 200 g of distilled water was placed in a hard-glass flask and the flask was covered with a lid made of hard glass, and allowed to stand at 50° C. for 24 hours as in the above.

From the difference between these two kinds of the distilled waters in analytical results obtained by atomic absorption spectrometry, ion chromatography, combustion-nondispersive infrared absorption method, etc., the amounts of atoms released from the test piece by dissolution were determined to find that the amount of titanium atoms released was 0.01 ppm (detection limit) or less, the amount of nickel atoms released 0.01 ppm (detection limit) or less, the amount of chlorine atoms released 0.02 ppm (detection limit) or less, and the total amount of organic carbon 2 ppm (detection limit) or less.

The aforesaid test piece was tested for soluble and releasable substances according to "Test Method of Plastics for Transfusion" prescribed in the Japanese Pharmacopoeia, the 12th revision. Bubbles disappeared within 3 minutes, the pH difference was −0.05, the ultraviolet absorption was 0.007, and the volume of reductive potassium permanganate was 0.10 ml. Thus, it was found that the test piece had characteristics suitable for medical use.

Example 2

19 Parts by weight of a polymer was obtained by carrying out hydrogenation reaction in the same manner as in Example 1 except that the ring-opening copolymerization product obtained in Referential Example 2 was used in place of the ring-opening polymerization product obtained in Referential Example 1.

Said polymer had an intrinsic viscosity of 0.40 dl/g as measured at 25° C. in toluene, and had a Tg of 118° C. In $^1$H-NMR spectrum (at 30° C. in chloroform-$d_1$) of the polymer, there were observed an absorption due to a proton bonded to a benzene ring at 7.4–6.8 ppm, an absorption due to a proton bonded to the unsaturated carbon of a —HC=CH— group at 5.9–4.4 ppm and an absorption due to a proton bonded to saturated carbon at 4.0–0.8 ppm, in the intensity ratio of approximately 13:0:87. Thus, the following were found: the polymer obtained was a hydrogenated product of the ring-opening copolymerization product obtained in Referential Example 2, the hydrogenation rate of the benzene rings was about 3%, and the unsaturated bonds in the backbone structure had been completely hydrogenated.

The polymer was press-molded into a sheet of 0.3 mm thickness at 200° C. The sheet was colorless and transparent and had a refractive index of 1.562.

Separately, the polymer was press-molded into a disc with a thickness of 1.2 mm and a diameter of 12.5 cm at 200° C. The disc had a light transmittance of 92% or more at 400 to 830 nm and a retardation value of 20 nm or less. When measured by the use of the disc, the volume resistivity of the polymer was $5 \times 10^{16}$ Ωcm or more and its dielectric constant and dielectric loss tangent were 2.39 and $5 \times 10^{-4}$, respectively, at any of frequencies $10^2$ Hz, $10^6$ Hz and $10^9$ Hz.

In addition, a 10 wt % solution of the polymer in toluene was analyzed by atomic absorption spectometry to find that the titanium atom content of the resin was 0.01 ppm (detection limit) or less and the nickel atom content 0.01 ppm (detection limit) or less. Further, 100 mg of the polymer was burned in a DOHRMANN combustor, absorbed into 5 ml of pure water and analyzed by ion chromatography to find that the chlorine atom content was 0.02 ppm (detection limit) or less.

To 100 parts by weight of the polymer was added 0.02 part by weight of an antioxidant (Irganox 1010, mfd. by Ciba-Geigy, Ltd.), and the resulting mixture was extruded into pellets with a twin-screw extruder (TEM-35B, mfd. by Toshiba Machine Co., Ltd.; screw diameter 37 mm, L/D=32, screw revolution rate 250 rpm, resin temperature 270° C., feed rate 10 kg/hour).

Using the pellets, a cylindrical, transparent container with a diameter of 200 mm, a height of 130 mm and an average thickness of 3 mm and 100 mm×50 mm×2.0 mm test pieces were produced by injection molding (clamping pressure 350 tons, resin temperature 265° C., mold temperature 70° C.).

The total light transmittance of the test piece was measured and found to be 90.2%, namely, its transparency was good. Its opacity was measured and found to be 0.1%.

To LB medium was added agar in an amount of 2 wt %, and the resulting mixture was subjected to steam sterilization at 121° C. for 30 minutes to be gelatinized. Before solidification, 300 ml of the gelatinized mixture was placed in the molded container and allowed to stand at room temperature for 6 hours, after which the container was capped with aluminum foil, followed by sterilization by γ-ray irradiation at a dose of 25 kGy. After the above treatment, incubation was carried out at 37° C. for 3 days but no bacterial multiplication took place in the mixture. The appearance of the transparent container after the treatment was so good that opacified portions, cracks and deformation were not visually confirmed.

After the test pieces were immersed in an aqueous sodium carbonate solution having a pH of 9, hydrochloric acid having a pH of 4 and ethanol, respectively, for 48 hours, their appearance was observed and found to be unchanged, and their opacity and total light transmittance also remained unchanged.

Each of these test pieces was cut to a width of 10 mm, and 20 g of the resulting piece was subjected to ultrasonic cleaning in distilled water for 20 minutes and then dried at 40° C. for 10 hours. In a hard-glass flask was placed 20 g of this test piece, followed by adding thereto 200 g of distilled water. The flask was covered with a lid made of hard glass, and allowed to stand at 50° C. for 24 hours, after which the distilled water was recovered.

For comparison, 200 g of distilled water was placed in a hard-glass flask and the flask was covered with a lid made of hard glass, and allowed to stand at 50° C. for 24 hours as in the above.

From the difference between these two kinds of the distilled waters in analytical results obtained by atomic absorption spectrometry, ion chromatography, combustion-nondispersive infrared absorption method, etc., the amounts of atoms released from the test piece by dissolution were determined to find that the amount of titanium atoms released was 0.01 ppm (detection limit) or less, the amount of nickel atoms released 0.01 ppm (detection limit) or less, the amount of chlorine atoms released 0.02 ppm (detection limit) or less, and the total amount of organic carbon 2 ppm (detection limit) or less.

The aforesaid test piece was tested for soluble and releasable substances according to "Test Method of Plastics for Transfusion" prescribed in the Japanese Pharmacopoeia, the 12th revision. Bubbles disappeared within 3 minutes, the pH difference was −0.03, the ultraviolet absorption was 0.005, and the volume of potassium permanganate-reducing substances was 0.11 ml. Thus, it was found that the test piece had characteristics suitable for medical use.

Example 3

18 Parts by weight of a polymer was obtained by carrying out hydrogenation reaction in the same manner as in Example 1 except that the ring-opening polymerization product obtained in Referential Example 3 was used in place of the ring-opening polymerization product obtained in Referential Example 1.

Said polymer had an intrinsic viscosity of 0.46 dl/g as measured at 25° C. in toluene, and had a Tg of 153° C. In $^1$H-NMR spectrum (at 30° C. in chloroform-$d_1$) of the polymer, there were observed an absorption due to a proton bonded to a naphthalene ring at 7.7–7.3 ppm, an absorption due to a proton bonded to the unsaturated carbon of a —HC=CH— group at 6.2–4.6 ppm, and an absorption due to a proton bonded to saturated carbon at 4.2–0.8 ppm, in the intensity ratio of approximately 34:0:66. Thus, the following were found: the polymer obtained was a hydrogenated product of the ring-opening polymerization product obtained in Referential Example 3, the hydrogenation rate of the naphthalene rings was about 6%, and the unsaturated bonds in the backbone structure had been completely hydrogenated.

The polymer was press-molded into a sheet of 0.3 mm thickness at 200° C. The sheet was colorless and transparent and had a refractive index of 1.659.

Separately, the polymer was press-molded into a disc with a thickness of 1.2 mm and a diameter of 12.5 cm at 200° C. The disc had a light transmittance of 88% or more at 400 to 830 nm and a retardation value of 50 nm or less. When measured by the use of the disc, the volume resistivity of the polymer was $5 \times 10^{16}$ Ωcm or more and its dielectric constant and dielectric loss tangent were 2.62 and $15 \times 10^{-4}$, respectively, at any of frequencies $10^2$ Hz, $10^6$ Hz and $10^9$ Hz.

Example 4

18 Parts by weight of a polymer was obtained by carrying out hydrogenation reaction in the same manner as in Example 1 except that the ring-opening copolymerization product obtained in Referential Example 4 was used in place of the ring-opening polymerization product obtained in Referential Example 1.

Said polymer had an intrinsic viscosity of 0.40 dl/g as measured at 25° C. in toluene, and had a Tg of 137° C. In $^1$H-NMR spectrum (at 30° C. in chloroform-$d_1$) of the polymer, there were observed an absorption due to a proton bonded to a benzene ring at 7.2–6.9 ppm, an absorption due to a proton bonded to the unsaturated carbon of a —HC=CH— group at 6.4–4.6 ppm and an absorption due to a proton bonded to saturated carbon at 4.1–0.6 ppm, in the intensity ratio of approximately 4:0:10. Thus, the following were found: the polymer obtained was a hydrogenated product of the ring-opening polymerization product obtained in Referential Example 4, the hydrogenation rate of the benzene rings was about 1.4%, and the unsaturated bonds in the backbone structure had been completely hydrogenated.

The polymer was press-molded into a sheet of 0.3 mm thickness at 200° C. The sheet was colorless and transparent and had a refractive index of 1.582.

Separately, the polymer was press-molded into a disc with a thickness of 1.2 mm and a diameter of 12.5 cm at 200° C. The disc had a light transmittance of 90% or more at 400 to 830 nm and a retardation value of 20 nm or less. When measured by the use of the disc, the volume resistivity of the polymer was $5 \times 10^{16}$ Ωcm or more and its dielectric constant and dielectric loss tangent were 2.41 and $5 \times 10^{-4}$, respectively, at any of frequencies $10^2$ Hz, $10^6$ Hz and $10^9$ Hz.

In addition, a 10 wt % solution of the polymer in cyclohexane was analyzed by atomic absorption spectometry to find that the titanium atom content of the resin was 0.01 ppm (detection limit) or less and the nickel atom content 0.01 ppm (detection limit) or less. Further, 100 mg of the polymer was burned in a DOHRMANN combustor, absorbed into 5 ml of pure water and analyzed by ion chromatography to find that the chlorine atom content was 0.02 ppm (detection limit) or less.

Pelletization was carried out in the same manner as in Example 2 except for using said polymer in place of the polymer obtained in Example 2 and changing the resin temperature to 220° C.

Using the pellets thus obtained, a cylindrical, transparent container and test pieces with a thickness of 3 mm and a diameter of 86 mm were produced by injection molding (clamping pressure 350 tons, resin temperature 285° C., mold temperature 85° C.) as in Example 2.

The total light transmittance of the test piece was measured and found to be 90.0%, namely, its transparency was good. Its opacity was measured and found to be 0.07%.

As in Example 2, 300 ml of LB medium containing 2 wt % agar and then one of the test pieces were placed in the molded container, after which the container was capped with aluminum foil, followed by steam sterilization at 120° C. for 30 minutes.

After the above treatment, incubation was carried out at 37° C. for 3 days but no bacterial multiplication took place in the medium. The appearance of the transparent container after the treatment was so good that opacified portions, cracks and deformation were not visually confirmed.

The opacity and total light transmittance of the test piece measured after removing the LB medium solidified by agar from the test piece taken out of the container were 0.18% and 88.9%, respectively.

After the other test pieces were immersed in an aqueous sodium carbonate solution having a pH of 9, hydrochloric acid having a pH of 4 and ethanol, respectively, for 48 hours, their appearance was observed and found to be unchanged, and their opacity and total light transmittance also remained unchanged. Each of the thus treated test pieces was cut to a width of 10 mm, and 20 g of the resulting piece was subjected to ultrasonic cleaning in distilled water for 20 minutes and then dried at 40° C. for 10 hours. In a hard-glass flask was placed 20 g of this test piece, and 200 g of distilled water was added. The flask was covered with a lid made of hard glass, followed by steam sterilization at 120° C. for 1 hour. The flask was cooled to room temperature and then allowed to stand for 24 hours, after which the distilled water was recovered.

For comparison, 200 g of distilled water was placed in a hard-glass flask and the flask was covered with a lid made of hard glass. As in the above, steam sterilization was carried out at 120° C. for 1 hour, and the flask was cooled to room temperature and then allowed to stand for 24 hours, after which the distilled water was recovered.

From the difference between these two kinds of the distilled waters in analytical results, the amounts of atoms released from the test piece by dissolution were determined to find that the amount of titanium atoms released was 0.01 ppm (detection limit) or less, the amount of nickel atoms released 0.01 ppm (detection limit) or less, the amount of chlorine atoms released 0.02 ppm (detection limit) or less, and the total amount of organic carbon 2 ppm (detection limit) or less.

The test for soluble and releasable substances was carried out according to the Japanese Pharmacopoeia as in Example 1. Bubbles disappeared within 3 minutes, the pH difference was −0.03, the ultraviolet absorption was 0.008, and the volume of potassium permanganate-reducing substances was 0.12 ml.

Example 5

17 Parts by weight of a polymer was obtained by carrying out hydrogenation reaction in the same manner as in Example 1 except that the ring-opening copolymerization product obtained in Referential Example 5 was used in place of the ring-opening polymerization product obtained in Referential Example 1.

Said polymer had an intrinsic viscosity of 0.49 dl/g as measured at 25° C. in toluene, and had a Tg of 141° C. In $^1$H-NMR spectrum (at 30° C. in chloroform-$d_1$) of the polymer, there were observed an absorption due to a proton bonded to a benzene ring at 7.3–7.1 ppm, an absorption due to a proton bonded to the unsaturated carbon of a —HC=CH— group at 6.4–4.6 ppm and an absorption due to a proton bonded to saturated carbon at 4.1–0.6 ppm, in the intensity ratio of approximately 19:0:81. Thus, the following were found: the polymer obtained was a hydrogenated product of the ring-opening polymerization product obtained in Referential Example 5, the hydrogenation rate of the benzene rings was about 4%, and the unsaturated bonds in the backbone structure had been completely hydrogenated.

The polymer was press-molded into a sheet of 0.3 mm thickness at 200° C. The sheet was colorless and transparent and had a refractive index of 1.610.

Comparative Example 1

Into an autoclave equipped with a stirrer were charged a solution prepared by dissolving 20 parts by weight of the ring-opening polymerization product obtained in Referential Example 1 in a mixed solvent of 30 parts by weight of toluene and 70 parts by weight of cyclohexane, and an alumina-supported nickel catalyst (content of supported nickel: 40% by weight). The inner atmosphere of the autoclave was replaced with hydrogen, and then the reaction was carried out for 10 hours at a hydrogen pressure of 50 kgf/cm$^2$ and a temperature of 220° C. After the alumina-supported nickel catalyst was removed from the reaction solution by filtration, the residue was diluted with 150 parts by weight of cyclohexane and then poured into 800 parts by weight of a mixed solution of 400 parts by weight of acetone and 400 parts by weight of isopropanol with vigorous stirring to precipitate a polymer, which was recovered. by filtration. Thereafter, the polymer was washed with 200 parts by weight of acetone and then dried at 100° C. for 24 hours in a vacuum dryer evacuated to a reduced pressure of 1 mmHg or less, to obtain 18 parts by weight of the polymer.

The polymer had an intrinsic viscosity of 0.43 dl/g as measured at 25° C. in toluene, and had a Tg of 141° C. In $^1$H-NMR spectrum (at 30° C. in chloroform-d$_1$) of the polymer, the absorption due to a proton bonded to a benzene ring at 7.1 ppm and the absorption due to a proton bonded to the unsaturated carbon of a —HC=CH— group at 5.9–4.6 ppm disappeared completely, and an absorption due to a proton bonded to saturated carbon was observed at 3.0–0.8 ppm. Thus, it was found that the polymer obtained was a hydrogenated product of the ring-opening polymerization product obtained in Referential Example 1, and that the unsaturated bonds in the benzen rings and the backbone structure had been completely hydrogenated.

The polymer was press-molded into a sheet of 0.3 mm thickness at 200° C. The sheet was colorless and transparent and had a refractive index of 1.527.

Comparative Example 2

57 Parts by weight of a polymer was obtained in the same manner as in Example 1 except for using 4,7-methano-3a,4,7,7a-tetrahydroindene in place of 1,4-methano-1,4,4a,9a-tetrahydrofluorene.

The intrinsic viscosity of the polymer was 0.44 dl/g as measured at 25° C. in toluene.

In $^1$H-NMR spectrum (at 30° C. in chloroform-d$_1$) of the polymer, there were observed an absorption due to a proton bonded to the unsaturated carbon of a —HC=CH— group at 5.7–4.6 ppm and an absorption due to a proton bonded to saturated carbon at 2.9–0.7 ppm, in the intensity ratio of 4:8. Thus, the polymer obtained was identified as a ring-opening polymerization product of 4,7-methano-3a,4,7,7a-tetrahydroindene.

19 Parts by weight of a polymer was obtained by carrying out hydrogenation reaction in the same manner as in Example 1 except that the ring-opening polymerization product of 4,7-methano-3a,4,7,7a-tetrahydroindene was used in place of the ring-opening polymerization product obtained in Referential Example 1.

Said polymer had an intrinsic viscosity of 0.43 dl/g as measured at 25° C. in toluene, and had a Tg of 95° C. In $^1$H-NMR spectrum (at 30° C. in chloroform-d$_1$) of the polymer, the absorption due to a proton bonded to the unsaturated carbon of a —HC=CH— group at 5.7–4.6 ppm disappeared completely, and an absorption due to a proton bonded to saturated carbon was observed at 2.5–0.8 ppm. Thus, it was found that the polymer obtained was a hydrogenated product of the ring-opening polymerization product of 4,7-methano-3a,4,7,7a-tetrahydroindene and that all the unsaturated bonds had been completely hydrogenated.

The polymer was press-molded into a sheet of 0.3 mm thickness at 200° C. The sheet was colorless and transparent and had a refractive index of 1.530.

Comparative Example 3

19 Parts by weight of a polymer was obtained by carrying out hydrogenation in the same manner as in Comparative Example 1 except that the reaction was carried out for 3 hours at a hydrogen pressure of 20 kgf/cm$^2$ and a temperature of 180° C. instead of carrying out the reaction for 10 hours at a hydrogen pressure of 50 kgf/cm$^2$ and a temperature of 220° C.

In $^1$H-NMR spectrum (at 30° C. in chloroform-d$_1$) of the polymer, there were observed an absorption due to a proton bonded to a benzene ring at 7.1 ppm, an absorption due to a proton bonded to the unsaturated carbon of a —HC=CH— group at 5.9–4.6 ppm and an absorption due to a proton bonded to saturated carbon at 4.0–0.8 ppm, in the intensity ratio of approximately 13:4:83. Thus, it was found that the polymer obtained was a hydrogenated product of the ring-opening polymerization product obtained in Referential Example 1, and that the hydrogenation rates of unsaturated bonds in the benzene rings and those in the backbone structure were 42% and 65%, respectively.

The polymer was press-molded into a sheet of 0.3 mm thickness at 200° C. The sheet had a high refractive index of 1.598 but it was colored and hence not usable as an optical material.

Separately, the polymer was press-molded into a disc with a thickness of 1.2 mm and a diameter of 12.5 cm at 200° C. The disc was tough but it had a yellow color and was highly colored particularly at the periphery. The light transmittance of a relatively lightly colored portion of the interior of the disc was 82.0%. When allowed to stand in the air at room temperature for 3 weeks, this molded disc was deteriorated in toughness to become brittle.

Comparative Example 4

18 Parts by weight of a polymer was obtained by carrying out hydrogenation reaction in the same manner as in Example 1 except for changing the hydrogen pressure, the temperature and the reaction time to 30 kgf/cm$^2$, 150° C. and 2 hours, respectively.

Said polymer had an intrinsic viscosity of 0.41 dl/g as measured at 25° C. in toluene, and had a Tg of 142° C. In $^1$H-NMR spectrum (at 30° C. in chloroform-d$_1$) of the polymer, there were observed an absorption due to a proton bonded to a benzene ring at 7.4–6.8 ppm, an absorption due to a proton bonded to the unsaturated carbon of a —HC=CH— group at 5.9–4.6 ppm and an absorption due to a proton bonded to saturated carbon at 4.0–0.8 ppm, in the intensity ratio of approximately 9:0:91. Thus, the following were found: the polymer obtained was a hydrogenated product of the ring-opening polymerization product obtained in Referential Example 1, the hydrogenation rate of the benzene rings was about 56%, and the unsaturated bonds in the backbone structure had been completely hydrogenated.

The polymer was press-molded into a sheet of 0.3 mm thickness at 200° C. The sheet was colorless and transparent and had a refractive index of 1.550.

Example 6

The hydrogenated product (refractive index: 1.586) obtained in Example 1 and the hydrogenated product (refractive index: 1.527) obtained in Comparative Example 1 were thoroughly kneaded in each of the ratios of 6:4,7:3 and 8:2 at 250° C. with a twin-screw extruder (TEM-35, mfd. by Toshiba Machine Co., Ltd.). The refractive indexes of the resin compositions thus obtained were 1.562, 1.569 and 1.574, respectively.

INDUSTRIAL APPLICABILITY

The hydrogenated norbornene ring-opening polymerization product or the resin composition of the present invention are excellent in heat resistance, transparency, low birefringent properties, weather resistance, light resistance, low water absorption properties, moisture resistance, small dielectric constant, small dielectric loss, chemical resistance, etc., has a high refractive index, and is suitable for use in optical materials, medical tools and materials, electrical insulating materials, and tools and materials for treating electronic parts.

We claim:

1. A hydrogenated norbornene ring-opening polymerization product characterized in that it is a hydrogenated product of a ring-opening polymerization product of a norbornene monomer having an aromatic ring structure, 95% or more of the unsaturated bonds in the polymer backbone structure are hydrogenated, and 80% or more of the aromatic ring structures in the polymer structure are retained.

2. A hydrogenated norbornene ring-opening polymerization product according to claim 1, wherein the ring-opening polymerization product of a norbornene monomer having an aromatic ring structure contains 30% by weight or more repeating structural units formed by opening of the norbornene ring of the norbornene monomer having an aromatic ring structure.

3. A hydrogenated norbornene ring-opening polymerization product according to claim 1 or 2, wherein the ring-opening polymerization product of a norbornene monomer having an aromatic ring structure contains 50% by weight or more repeating structural units formed by opening of the norbornene ring of the norbornene monomer.

4. A hydrogenated norbornene ring-opening polymerization product according to claims 1 or 2, wherein the norbornene monomer having an aromatic ring structure is a norbornene monomer having an aromatic ring structure having a halogen substituent.

5. A hydrogenated norbornene ring-opening polymerization product according to claim 4, wherein the norbornene monomer having an aromatic ring structure having a halogen substituent is 1,4-methano-8-bromo-1,4,4a,9a-tetrahydrofluorene, 1,4-methano-6-bromo-1,4,4a,9a-tetrahydrofluorene or 1,4-methano-6,8-dibromo-1,4,4a,9a-tetrahydrofluorene.

6. A hydrogenated norbornene ring-opening polymerization product according to claim 1 or 2, which has a refractive index at 25° C. of 1.560 or more at a wavelength of 589 nm.

7. A hydrogenated norbornene ring-opening polymerization product according to claim 1 or 2, which has an intrinsic viscosity [η] of 0.1 to 20 dl/g as measured at 25° C. in toluene.

8. A hydrogenated norbornene ring-opening polymerization product according to claim 1 or 2, which has a glass transition temperature of 70° C. or higher.

9. A hydrogenated norbornene ring-opening polymerization product according to claim 1 or 2, which has a transmittance for light with a wavelength of 400 to 830 nm of 70% or more at a thickness of 1.2 mm.

10. A hydrogenated norbornene ring-opening polymerization product according to claim 1 or 2, which has a volume resistivity of $10^{16}$ Ωcm or more.

11. A hydrogenated norbornene ring-opening polymerization product according to claim 1, which has a dielectric constant of 3 or less at any of frequencies $10^2$ Hz, $10^6$ Hz and $10^9$ Hz.

12. A hydrogenated norbornene ring-opening polymerization product according to claim 1, which has a dielectric loss tangent of $10^{-3}$ or less at any of frequencies $10^2$ Hz, $10^6$ Hz and $10^9$ Hz.

13. A process for producing a hydrogenated norbornene ring-opening polymerization product set forth in claim 1 or 2, in which a ring-opening polymerization product of a norbornene monomer having an aromatic ring structure is hydrogenated using a catalyst composed of a combination of a transition metal compound and an alkyl metal compound.

14. A production process according to claim 13, wherein the hydrogenation is carried out at a reaction temperature of 120° C. or lower and a hydrogen pressure of 50 kgf/cm$^2$ or less.

15. A resin composition comprising a hydrogenated norbornene ring-opening polymerization product set forth in claim 1 or 2, and a hydrogenated norbornene ring-opening polymerization product other than a resin composition comprising a hydrogenated norbornene ring-opening polymerization product set forth in claim 1 or 2.

16. A resin composition comprising a hydrogenated norbornene ring-opening polymerization product characterized in that it is a hydrogenated product of a ring-opening polymerization product of a norbornene monomer having an aromatic ring structure, 95% or more of the unsaturated bonds in the polymer backbone structure are hydrogenated, and 80% or more of the aromatic ring structures in the polymer structure are retained; and a hydrogenated product of said ring-opening polymerization product characterized in that 95% or more of both the unsaturated bonds in the polymer backbone structure and those in the aromatic ring structures are hydrogenated.

17. An optical material comprising a hydrogenated norbornene ring-opening polymerization product set forth in claim 1 or 2.

18. A medical tool or material comprising a hydrogenated norbornene ring-opening polymerization product set forth in claim 1 or 2.

19. An electrical insulating material comprising a hydrogenated norbornene ring-opening polymerization product set forth in claim 1 or 2.

20. A tool or material for treating an electronic part, which comprises a hydrogenated norbornene ring-opening polymerization product set forth in claim 1 or 2.

21. A process according to claim 13, wherein the ring-opening polymerization product of a norbornene monomer having aromatic ring structures is hydrogenated in an inert organic solvent, and wherein the amount of the solvent is 0.8–20 parts by weight per part by weight of the norbornene ring-opening polymerization product having aromatic ring structures.

22. A process according to claim 21, wherein the amount of the solvent is 1 to 10 parts by weight per part by weight of the norbornene ring-opening polymerization product having aromatic ring structures.

* * * * *